United States Patent
Kar et al.

(10) Patent No.: US 8,473,252 B2
(45) Date of Patent: Jun. 25, 2013

(54) SYSTEM AND METHOD FOR CONFLICT RESOLUTION TO SUPPORT SIMULTANEOUS MONITORING OF MULTIPLE SUBSYSTEMS

(75) Inventors: Chinmaya Kar, Bangalore (IN); Venkataramana Bantwal Kini, Bangalore (IN); Vedika Agrawal, Delhi (IN); Meenakshi Sunderam, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 437 days.

(21) Appl. No.: 12/797,472

(22) Filed: Jun. 9, 2010

(65) Prior Publication Data

US 2011/0307218 A1    Dec. 15, 2011

(51) Int. Cl.
*G06F 11/30* (2006.01)
*G06F 19/00* (2011.01)
*G01H 17/00* (2006.01)

(52) U.S. Cl.
USPC ........... 702/185; 73/579; 73/865.8; 73/865.9; 73/866.3; 340/679; 340/683; 702/56; 702/183; 702/189

(58) Field of Classification Search
USPC .......... 73/570, 577, 579, 865.8, 865.9, 866.3; 340/500, 540, 679, 582, 683; 702/1, 33, 34, 702/35, 39, 56, 127, 182, 183, 185, 189; 706/902, 911, 912, 914
IPC . G01D 7/00; G01H 17/00; G01M 13/00,13/04; G06F 11/00, 11/30, 11/32, 17/00, 17/40, G06F 19/00
See application file for complete search history.

(56) References Cited

U.S. PATENT DOCUMENTS

| | | | | |
|---|---|---|---|---|
| 2,799,015 | A | * | 7/1957 | Bell .............................. 340/683 |
| 2,883,255 | A | * | 4/1959 | Anderson ........................ 346/34 |
| 3,242,321 | A | * | 3/1966 | Chope ........................... 702/185 |
| 4,286,515 | A | | 9/1981 | Baumann et al. |
| 4,621,177 | A | | 11/1986 | Pulkowski et al. |
| 4,675,487 | A | | 6/1987 | Verkasalo |
| 4,704,191 | A | | 11/1987 | Wedel |

(Continued)

FOREIGN PATENT DOCUMENTS

| EP | 1 097 363 B1 | 12/2007 |
|---|---|---|
| JP | 07-190849 A * | 7/1995 |

(Continued)

OTHER PUBLICATIONS

Laibin Zhang, et al., "Short-term fault prediction of mechanical rotating parts on the basis of fuzzy-grey optimising method", Mechanical Systems and Signal Processing 21 (2007), p. 856-865.

(Continued)

*Primary Examiner* — Edward Cosimano

(57) ABSTRACT

A system includes a subsystem interaction module device, which includes at least one interface configured to receive input signals associated with multiple components of a system. The subsystem interaction module device also includes at least one processing unit configured to identify a potential fault in one or more of the components using the input signals and to provide an indicator identifying the potential fault. The at least one processing unit is configured to identify the potential fault by: identifying conflicting frequencies that are associated with different faults in the components of the system; and determining a confidence level associated with the potential fault based on the conflicting frequencies.

20 Claims, 12 Drawing Sheets

U.S. PATENT DOCUMENTS

| | | | |
|---|---|---|---|
| 5,262,958 | A | 11/1993 | Chui et al. |
| 5,381,697 | A | 1/1995 | van der Pol |
| 5,519,337 | A | 5/1996 | Casada |
| 5,594,180 | A | 1/1997 | Carpenter et al. |
| 5,616,824 | A | 4/1997 | Abdel-Malek et al. |
| 5,641,891 | A | 6/1997 | Frankl et al. |
| 5,646,600 | A | 7/1997 | Abdel-Malek et al. |
| 5,750,879 | A | 5/1998 | Ohtsuka et al. |
| 5,939,625 | A | 8/1999 | Torii et al. |
| 5,966,674 | A | 10/1999 | Crawford et al. |
| 6,208,943 | B1 | 3/2001 | Randolph et al. |
| 6,349,637 | B1 | 2/2002 | Molteni |
| 6,408,676 | B1 | 6/2002 | Stratton et al. |
| 6,484,109 | B1 | 11/2002 | Lofall |
| 6,505,517 | B1 | 1/2003 | Eryurek et al. |
| 6,539,315 | B1 | 3/2003 | Adams et al. |
| 6,634,000 | B1 * | 10/2003 | Jammu et al. ............ 714/37 |
| 6,654,697 | B1 | 11/2003 | Eryurek et al. |
| 6,657,529 | B1 | 12/2003 | Albach |
| 6,691,249 | B1 * | 2/2004 | Barford et al. ............ 714/25 |
| 6,708,291 | B1 * | 3/2004 | Kidder ............ 714/39 |
| 6,725,167 | B2 | 4/2004 | Grumstrup et al. |
| 6,727,725 | B2 | 4/2004 | Devaney et al. |
| 6,757,668 | B1 | 6/2004 | Goebel et al. |
| 6,845,340 | B2 | 1/2005 | Edie et al. |
| 6,900,420 | B2 | 5/2005 | Markegard et al. |
| 6,941,785 | B2 | 9/2005 | Haynes et al. |
| 7,257,501 | B2 | 8/2007 | Zhan et al. |
| 7,274,995 | B2 | 9/2007 | Zhan et al. |
| 7,286,945 | B2 | 10/2007 | Zhan et al. |
| 7,421,374 | B2 | 9/2008 | Zhan et al. |
| 7,509,234 | B2 * | 3/2009 | Unnikrishnan et al. ...... 702/183 |
| 7,640,139 | B2 * | 12/2009 | Sahara et al. ............ 702/183 |
| 2002/0020144 | A1 | 2/2002 | Sarles et al. |
| 2002/0152052 | A1 * | 10/2002 | Tsuru ............ 702/183 |
| 2003/0019297 | A1 | 1/2003 | Fiebelkorn et al. |
| 2003/0216888 | A1 | 11/2003 | Ridolfo |
| 2004/0024568 | A1 | 2/2004 | Eryurek et al. |
| 2004/0199828 | A1 * | 10/2004 | Cabezas et al. ............ 714/39 |
| 2005/0104020 | A1 | 5/2005 | Zhan et al. |
| 2006/0025970 | A1 | 2/2006 | Wegerich |
| 2006/0071666 | A1 | 4/2006 | Unsworth et al. |
| 2007/0088534 | A1 | 4/2007 | MacArthur et al. |
| 2008/0033695 | A1 * | 2/2008 | Sahara et al. ............ 702/185 |
| 2009/0049338 | A1 * | 2/2009 | Unnikrishnan et al. ........ 714/26 |
| 2010/0030492 | A1 | 2/2010 | Kar et al. |

FOREIGN PATENT DOCUMENTS

| | | | |
|---|---|---|---|
| KR | 20030048779 A | | 6/2003 |
| KR | 20050011919 A | | 1/2005 |
| WO | WO 00/04361 A1 * | | 1/2000 |
| WO | WO 03/090091 A1 | | 10/2003 |

OTHER PUBLICATIONS

Michael J. Devaney, et al., "Detecting Motor Bearing Faults", IEEE Instrumentation & Measurements Magazine, Dec. 2004, p. 30-35 & 50.

Jason R. Stack, et al., "Fault Classification and Fault Signature Production for Rolling Element Bearings in Electric Machines", IEEE Transactions on Industry Applications, vol. 40, No. 6 May/Jun. 2004, p. 735-739.

Peter W. Tse, et al., "Wavelet Analysis and Envelope Detection for Rolling Element Bearing Fault Diagnosis—Their Effectiveness and Flexibilities", Journal of Vibration and Acoustics, Jul. 2001, vol. 123, p. 303-310.

V. Sugumaran, et al., "Automatic rule learning using decision tree for fuzzy classifier in fault diagnosis of roller bearing", Mechanical Systems and Signal Processing 21 (2007), p. 2237-2247.

Yaguo Lei, et al., "Fault diagnosis of rotating machinery based on multiple ANFIS combination with GA s", Mechanical Systems and Signal Processing 21 (2007), p. 2280-2294.

Jason R. Stack, et al., "An Amplitude Modulation Detector for Fault Diagnosis in Rolling Element Bearings", IEEE Transactions on Industrial Electronics, vol. 51, No. 5, Oct. 2004, p. 1097-1102.

Robert B. Randall, "State of the Art in Monitoring Rotating Machinery—Part 1", Sound and Vibration, Mar. 2004, p. 14-20.

Z.K. Peng, et al., "A comparison study of improved Hilbert-Huang transform and wavelet transform: Application to Fault disgnosis for rolling bearing", Mechanical Systems and Signal Processing 19 (2005), p. 974-988.

Xinsheng Lou, et al., "Bearing fault diagnosis based on wavelet transform and fuzzy inference", Mechanical Systems and Signal Processing 18 (2004) p. 1077-1095.

T.I. Liu, et al., "Detection of Roller Bearing Defects Using Expert System and Fuzzy Logic", Mechanical Systems and Signal Processing (1996) 10(5), p. 595-614.

Yaguo Lei, et al., "A new approach to intelligent fault diagnosis of rotating machinery", Expert Systems with Applictaions 35 (2008), p. 1593-1600.

Paula J. Dempsey, et al., "Tapered Roller Bearing Damage Detection Using Decision Fusion Analysis", NASA/TM-2006-21430, Jul. 2006, 23 pages.

A.R. Mohanty, et al., "Fault Detection in a Multistage Gearbox by Demodulation of Motor Current Waveform", IEEE Transactions on Industrial Electronics, vol. 53, No. 4, Aug. 2006, p. 1285-1297.

Chinmaya Kar, et al., "Vibration and current transient monitoring for gearbox fault detection using multiresolution Fourier transform", Journal of Sound and Vibration 311 (2008), p. 109-132.

Chinmaya Kar, et al., "Monitoring gear vibrations through motor current signature analysis and wavelet transform", Mechanical Systems and Signal Processing 20 (2006), p. 158-187.

T. Lindth et al., "Automatic bearing fault classification combining statistical classification and fuzzy logic", 4th Nordic Workshop in Power & Industrial Electronics, Jun. 2004, 5 pages.

Carl S. Byington, P.E., et al., "In-Line Health Monitoring System for Hydraulic Pumps and Motors", 2003 IEEE, 9 pages.

Kai F. Goebel, "Conflict Resolution Using Strengthening and Weakening Operations in Decision Fusion", Proceedings of the 4th Annual Conference on Information Fusion, Fusion 2001, pp. ThA1-19-ThA1-25, 2001.

Sanket Amin, et al., "Fuzzy Inference and Fusion for Health State Diagnosis of Hydraulic Pumps and Motors", AFDDPS-NAFIPS, Jun. 2005, 6 pages.

Simon G. Braun, "The Signature Analysis of Sonic Bearing Vibrations", IEEE Transactions on Sonics and Ultrasonics, vol. SU-27, No. 6, Nov. 1980, pp. 317-327.

Y. Gao et al., "Wavelet-Based Pressure Analysis for Hydraulic Pump Health Diagnosis", Transactions of the ASAE, vol. 46(4), pp. 969-976, 2003.

Alexander Horch, "A Simple Method for Detection of Stiction in Control Valves", Control Engineering Practice, Pergamon Press, Oxford, GB, vol. 7, 1999, pp. 1221-1231.

Jiang Wanlu et al., "Applying Multiresolution Analysis for Processing of Hydraulic Pump Fault Signal", Fifth International Conference on Fluid Power Transmission and Control, Hangzhou, China, Apr. 2001, pp. 1-5.

Fujun He et al. "WPT-SVMs Based Approach for Fault Detection of Valves in Reciprocating Pumps", Proceedings of the American Control Conference, Anchorage, AK, May 8-10, 2002, pp. 4566-4570.

Mallat et al., "Singularity Detection and Processing with Wavelets", Mar. 1992, IEEE Transactions on Information Theory, vol. 38, No. 2, pp. 617-643.

Wang et al., "The Fault Character of the Motors Identified Based on Wavelet Transform", Nov. 2-5, 2003, Proceedings of the Second International Conference on Machine Learning and Cybernetics, Xi'an, pp. 2394-2398.

Gao et al., "Support Vector Machines Based Apprroach for Fault Diagnosis of Valves in Reciprocating Pumps", 2002 IEEE Canadian Conference, pp. 1622-1627.

Ren et al., "Fault Feature Extracting by Wavelet Transform for Control System Fault Detection and Diagnosis", 2000 IEEE, International Conference on Control Applications, pp. 485-489.

International Search Report for PCT/US2004/038766, issued by the International Searching Authority, mailed Apr. 14, 2005, by the European Patent Office, P.B. 5818 Patentlaan 2, NL-2280 HV Rijswijk.

Parvez S. et al., "A Wavelet-Based Multi-Resolution PID Controller", 2003 IEEE Conference, Salt Lake City, UT, Oct. 2003, vol. 3 of 3, Conf. 38, pp. 1-5.

Zhihan Xu et al., "Design of-Fault Detection and Isolation Via Wavelet Analysis and Neural Network", 2002 IEEE International Symposium, Vancouver, Canada, Oct. 2002, pp. 467-472.

Song Zhihuan et al., "Adaptive Predictive Control Based on Wavelet Approximation Models", IEEE Conference, Beijing China, Oct. 1996, vol. 2, pp. 820-824.

Xiaohua Xia et al., "Nonlinear Adaptive Predictive Control Based on Orthogonal Wavelet Networks", Shanghai China, Jun. 2002, vol. 1, pp. 305-311.

Nounou M N et al., "Multiscale Fuzzy System Identification", Journal of Process Control, Oxford, GB, vol. 15, No. 7, Oct. 2005, pp. 763-770.

Billings S A et al., "Discrete Wavelet Models for Identification and Qualitative Analysis of Chaotic Systems", Singapore, SG, vol. 9, No. 7, Jul. 1999, pp. 1263-1284.

Chinmaya Kar, "System and Method for Gearbox Health Monitoring", U.S. Appl. No. 12/417,475, filed Apr. 2, 2009.

Chinmaya Kar, "System and Method for Determining Health Indicators for Impellers", U.S. Appl. No. 12/417,452, filed Apr. 2, 2009.

Notification of Transmittal of the International Search Report and the Written Opinion of the International Searching Authority, or the Declaration dated Dec. 7, 2011 in connection with International Patent Application No. PCT/US2011/038856.

* cited by examiner

SYSTEM AND METHOD FOR CONFLICT RESOLUTION TO SUPPORT SIMULTANEOUS MONITORING OF MULTIPLE SUBSYSTEMS

TECHNICAL FIELD

This disclosure relates generally to rotating machinery monitors and more specifically to a system and method for conflict resolution to support simultaneous monitoring of multiple subsystems.

BACKGROUND

Mechanical and electrical machinery can include a number of subsystems or components, such as a shaft, bearings, gears, impellers, stators, rotors, and so forth. The machinery and its subsystems are often monitored to detect potential failures (such as faults) at an early stage in order to prevent secondary damage, save maintenance costs, improve plant uptimes (such as machine availability), save potential financial losses from plant downtime, and assist towards increasing productivity. The monitoring can include a variety of signal processing, pattern recognition, or statistical techniques.

Monitoring systems (such as health monitors) often utilize various signal processing techniques, such as Fast Fourier Transform (FFT) analysis, enveloping, time-frequency analysis and wavelet transforms, to detect defects in individual subsystems. However, since subsystems interact with each other, monitoring any subsystem in isolation can create a number of false positives or true negatives. In addition, a conflict can exist between two or more subsystems that the monitoring system may be unable to solve.

SUMMARY

This disclosure provides a system and method for conflict resolution to support the simultaneous monitoring of multiple subsystems.

In a first embodiment, an apparatus includes at least one interface configured to receive input signals associated with multiple components of a system; and at least one processing unit configured to identify a potential fault in one or more of the components using the input signals and to provide an indicator identifying the potential fault. The at least one processing unit is configured to identify the potential fault by: identifying conflicting frequencies that are associated with different faults in the components of the system; and determining a confidence level associated with the potential fault based on the conflicting frequencies.

In a second embodiment, a method includes receiving input signals associated with multiple components of a system. One or more frequencies are identified for each of multiple faults that could occur in the components. The method also includes identifying conflicting frequencies that are associated with different faults in the components; and identifying a potential fault in one or more of the components using the input signals. Further, the method includes determining a confidence level associated with the potential fault based on the conflicting frequencies; and outputting an indicator identifying the potential fault.

In a third embodiment, a computer readable medium embodies a computer program. The computer program includes computer readable program code for receiving input signals associated with multiple components of a system. The computer readable program code also identifies one or more frequencies for each of multiple faults that could occur in the components; identifies conflicting frequencies that are associated with different faults in the components; and identifies a potential fault in one or more of the components using the input signals. The computer readable program code also is used for determining a confidence level associated with the potential fault based on the conflicting frequencies; and outputting an indicator identifying the potential fault.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7B, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
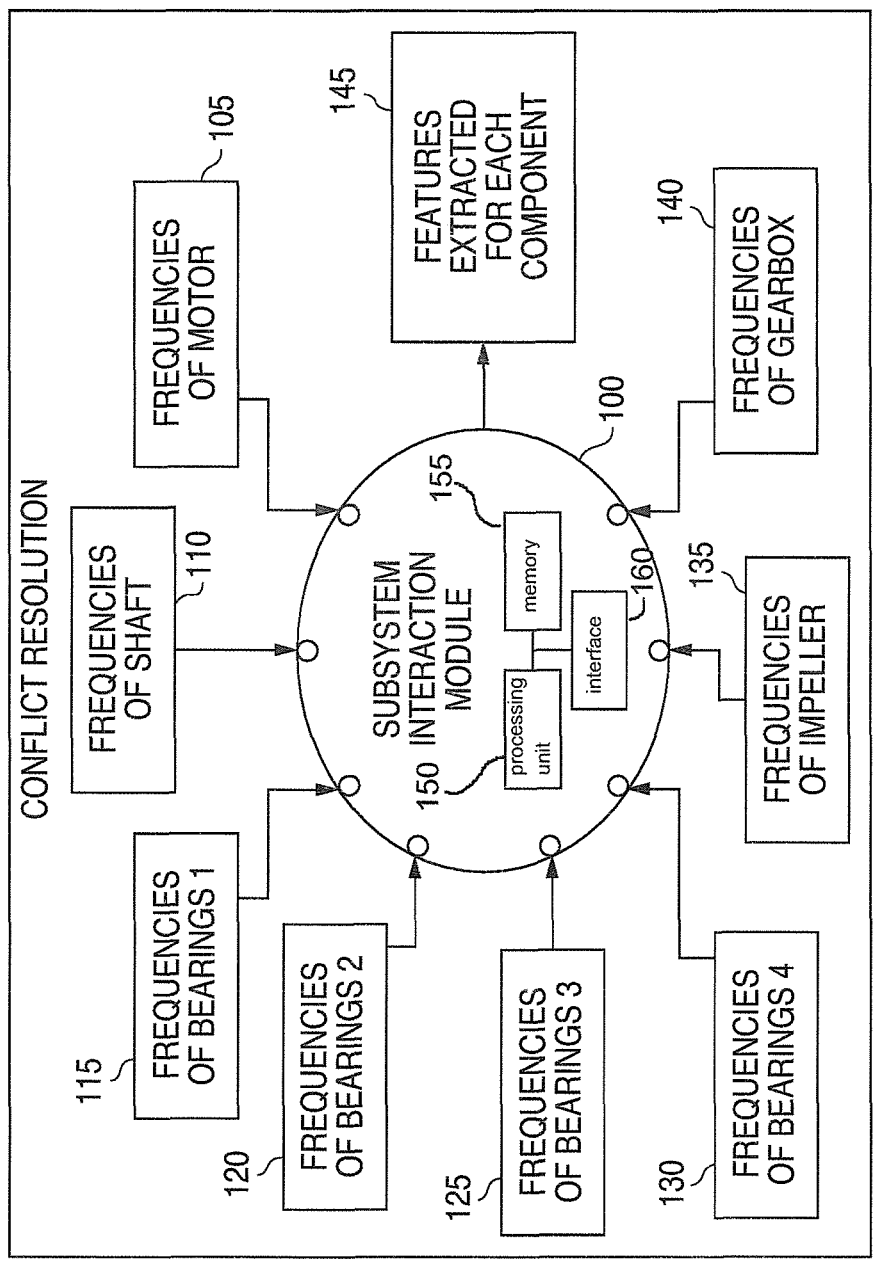
FIG. 1 illustrates an example conflict resolution system according to this disclosure.

FIG. 1 illustrates an example conflict resolution system according to this disclosure. The embodiment of the conflict resolution system shown in FIG. 1 is for illustration only. Other embodiments could be used without departing from the scope of this disclosure.

As shown in FIG. 1, the system includes a subsystem interaction module (SSIM) 100, which is coupled to monitors 105-140 corresponding to different components (subsystems) of a rotating machine. The SSIM 100 receives frequency characteristics of a motor, a shaft, multiple sets of bearings, an impeller, and a gearbox from the monitors 105-140 in this example.

The monitors can be any fault detection system or health monitoring system such as disclosed in pending U.S. patent application Ser. No. 12/417,452 entitled "SYSTEM AND METHOD FOR DETERMINING HEALTH INDICATORS FOR IMPELLERS" filed on Apr. 2, 2009; and U.S. patent application Ser. No. 12/417,475 entitled "SYSTEM AND METHOD FOR GEARBOX HEALTH MONITORING" filed on Apr. 2, 2009 (now U.S. Pat. No. 7,945,397). The contents of application Ser. Nos. 12/417,452 and 12/417,475 are hereby incorporated by reference.

The SSIM 100 extracts information about overlapping frequencies in the signals from the monitors 105-140 and outputs features 145 based on the extracted information. The features 145 can include statistical features, such as an RMS value of a band-pass frequency in the impeller's signal, an RMS value for a gear mesh frequency of the gearbox's signal, and so forth. These features can be indicative of various faults in the rotating machine.

Each of the monitors 105-140 can obtain signals containing any suitable information about a monitored subsystem. For example, a signal could include frequency characteristics of vibration, noise, motor current, voltage, or speed spectra. Also, different monitoring techniques can be related. For instance, the frequencies of a vibration or a noise signature may be reflected as sidebands in the line frequencies of a motor current or voltage signature. Similarly, very high frequencies of vibration may be reflected in noise or acoustics emission signals, but they may not be reflected in the vibration signals due to the limitation of the frequency bandwidth of an accelerometer.

In other words, different problems (such as faults) in multiple subsystems can be detected based on frequency information contained in signals from the monitors 105-140. In response, a condition indicator can be generated that indicates that a certain condition has been detected, and a confidence level can be generated that identifies the certainty of the detected condition. However, conflicts can exist when a signal's frequency could be indicative of multiple types of faults. This makes it difficult to monitor multiple subsystems and identify faults in those subsystems simultaneously.

Some conventional approaches attempt to resolve conflicts by fusing measurements, such as with Fuzzy Logic systems. However, these conventional approaches typically do not consider or account for inherent conflicts that can arise when a system includes a number of subsystems.

In accordance with this disclosure, the SSIM 100 is configured to improve fault detection when a number of subsystems are present in a rotating machine. The SSIM 100 can also determine a confidence level for a condition indicator of any subsystem when a conflict among subsystems exists. Moreover, the SSIM 100 can determine a confidence level for a condition indicator of the system as a whole when an inconsistency exists due to data repeatability. In addition, the SSIM 100 can identify when a conflict exists between two or more components and calculate a confidence level for each component based on the overlap of the individual frequency characteristics for those components. The SSIM 100 can use the confidence level(s) to inform an operator of the likelihood of a fault or other condition existing in the rotating machine, or the SSIM 100 can use the confidence level(s) internally to handle condition indicators for particular subsystems.

Conflicts between detectable conditions may occur for any number of reasons. For example, a first conflict (Conflict 1) can result from a similarity in subsystem characteristics, such as vibration characteristics of two subsystems having the same or some overlapping frequencies. A second conflict (Conflict 2) can result from a similarity in failure mode characteristics, such as the background noise or noise floor in a frequency-domain signature created by a number of failure modes or combination of failure modes. A third conflict (Conflict 3) can result from similarity in subsystem configurations, such as two bearings in the same machine having a matching geometry. A fourth conflict (Conflict 4) can occur when health indicators are inconsistent and give different values at different times, which may be due to data repeatability issues.

The frequency characteristics of a system are often dependent on the configuration of its subsystems. For example, a motor driven pump can include twenty-four rotor bars and eight impeller vanes. Higher harmonics of the impeller vane pass frequencies can be the same as or similar to the harmonics of the rotor bar passing frequency in a vibration signal. When there is a fault in the impeller vane or in the rotor bar, this type of frequency overlap can confuse an operator regarding the actual type of fault that is occurring. For example, an impeller vane fault can appear as an impeller fault or a rotor bar fault.

The SSIM 100 utilizes component-related frequency characteristics for solving conflicts amongst the components. The SSIM 100 can utilize failure mode-related frequency characteristics to solve conflicts amongst the failure modes. Three conflicts described above (Conflicts 1, 2, and 3) arise out of these frequency characteristics, as the frequency characteristics may be similar or overlapping in nature (as illustrated in Table 1). The fourth conflict (Conflict 4) is related to inconsistent health indicators due to data or any other repeatability issues. Table 1 illustrates Conflicts 1 through 4 and their respective effects:

TABLE 1

| Conflict | Impact | Examples | Example output or action from SSIM 100 |
|---|---|---|---|
| Conflict 1 | False positive or true negatives as one defect is viewed as another defect | If no. of vanes in an impeller is 6, then the impeller vane pass frequency (6X) matches with shaft frequencies 6X (there is a conflict between impeller wear and shaft looseness). | 1. Show two failure mode indicators (impeller wear and shaft looseness), each with its own confidence level. 2. Lessen the failure mode indicators by multiplying the prior indicator with the confidence level. 3. Separate features so that only the actual fault indicators will be visualized. |
| Conflict 2 | No fault isolation of the failure modes | Cavitations, bearing wear, and gear wear lead to a rise in the background noise. | 1. Find internal rules at subsystems level to mitigate risk. 2. Show two failure mode indicators, each with its own confidence level. 3. Lessen the failure mode indicator by multiplying the prior indicator with the confidence level. |
| Conflict 3 | No fault isolation of these components | Two or more bearings have same configuration, leading to the same frequency characteristics of each bearings. | 1. Use multi-sensors at locations near these components. 2. Show various confidence levels for indicators of each component failure. 3. Lessen the indicators by multiplying the prior indicator with the confidence level. |
| Conflict 4 | False positives due to inconsistent values | Data repeatability issues arise when there is a foundation looseness or sensor damage or when the vibration transmission path is | 1. Average the health indicator with a persistent time. 2. Show the health indicator after some |

TABLE 1-continued

| Conflict | Impact | Examples | Example output or action from SSIM 100 |
|---|---|---|---|
| | | very large. | persistent time and with a confidence level. |

Additional details regarding how the SSIM 100 operates to produce this functionality are provided below.

The SSIM 100 includes any suitable structure for processing overlapping signals from multiple subsystems to identify faults or other problems in the subsystems. In this example, the SSIM 100 includes at least one processing unit 150, such as a microprocessor, microcontroller, digital signal processor, field programmable gate array, or application-specific integrated circuit. The SSIM 100 also includes at least one memory 155 storing instructions and data used, generated, or collected by the processing units. The SSIM 100 further includes at least one network interface 160 for receiving data from one or more monitors 105-140.

Although FIG. 1 illustrates one example of a conflict resolution system supporting the monitoring of multiple subsystems, various changes may be made to FIG. 1. For example, the monitors 105-140 shown in FIG. 1 are for illustration only. Systems or devices for monitoring any other or additional subsystems could also be used.

Figure 2A:
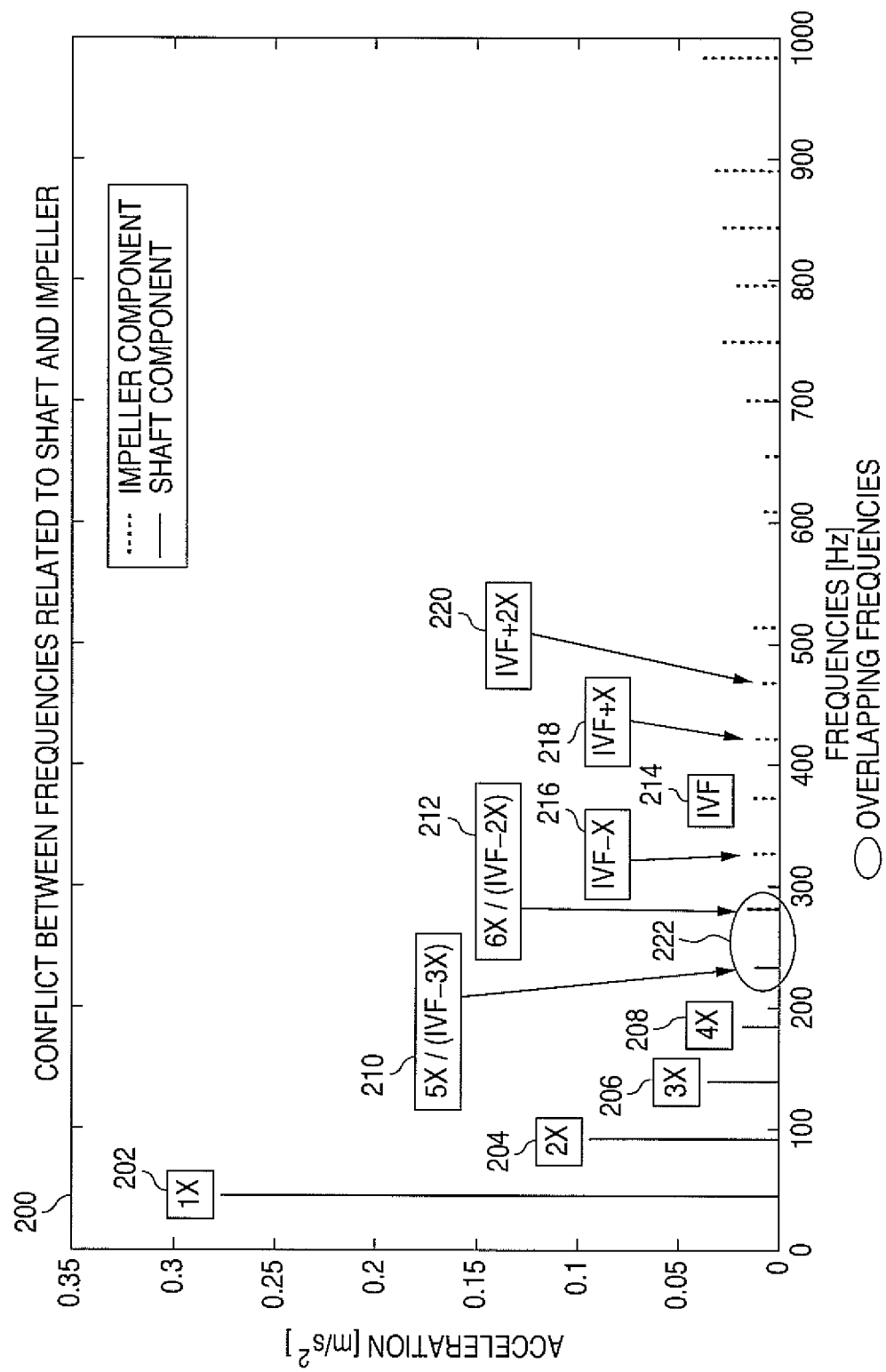
FIG. 2A illustrates example spectra of impeller and shaft components showing overlapping frequencies according to this disclosure.
Figure 2B:
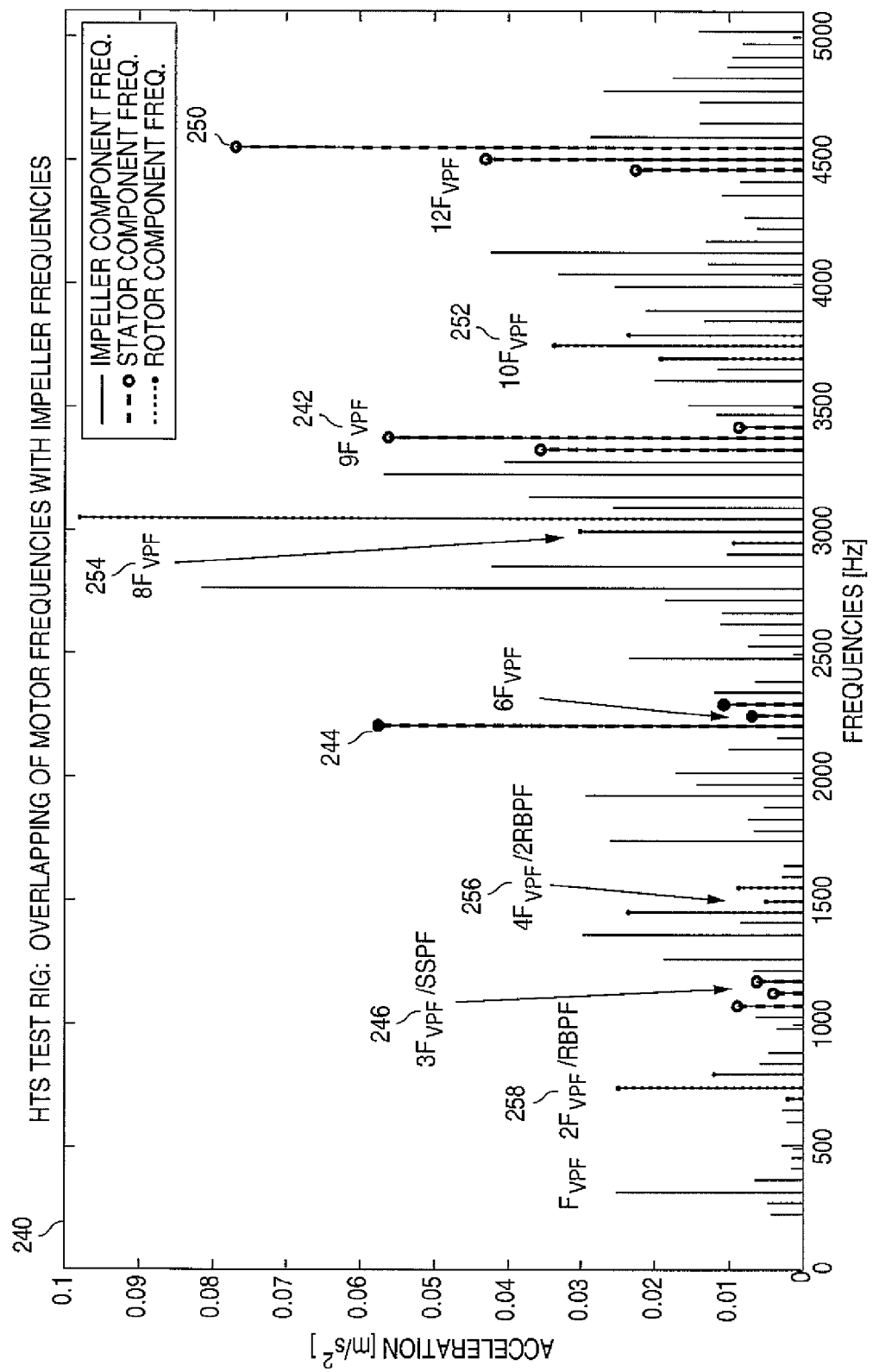
FIG. 2B illustrates example spectra of impeller and motor components showing overlapping frequencies according to this disclosure.

FIGS. 2A and 2B illustrate example spectra 200, 240 of impeller, shaft, and rotor components according to this disclosure. The spectra 200, 240 shown in FIGS. 2A and 2B are for illustration only. Other spectra could exist without departing from the scope of this disclosure.

In the example shown in FIG. 2A, the shaft component is associated with various frequencies 202-212. Also, the impeller vane pass frequency (IVF) includes a frequency 214 (when the number of impeller vanes is eight), and multiple IVF sidebands exist at the frequencies 210-212, 216-220. In this example, the frequencies 210 and 212 include both the shaft frequencies and the IVF sideband frequencies (as shown by the overlapping region 222). The amplitudes at these overlapping frequencies in the overlapping region 222 are not large in this example. However, in some examples, the amplitudes may be very large. Because of this, a shaft fault may be reflected as an impeller fault or vice versa, which results in a false positive or true negative. There may be also times where multiple faults exist, such as simultaneous shaft looseness and impeller cracks, which may give rise to larger amplitudes in the overlapping region 222.

As shown in FIG. 2B, there can also be overlap in the spectrum of rotor bar frequencies, stator slot frequencies, and impeller vane pass frequencies. In this example, the stator-related frequencies conflict (overlap) in regions 242-246 with harmonics and sidebands of the impeller vane pass frequencies. Also, the rotor-related frequencies conflict in regions 244, 250-258 with harmonics and sidebands of the impeller vane pass frequencies. In addition, the stator- and rotor-related frequencies conflict in regions 244 and 250. Therefore, an impeller fault may incite indication of a rotor or stator fault or vice versa.

The SSIM 100 can help to reduce or eliminate problems caused by overlapping fault frequencies. As described above, the SSIM 100 can identify different faults and a confidence level associated with each detected type of fault. The SSIM 100 can then provide an indication of the type(s) of fault(s) detected and the likelihood of each type. Additional details regarding the SSIM 100 are provided below.

Although FIGS. 2A and 2B illustrate examples of spectra 200, 240 for impeller and shaft components, various changes may be made to FIGS. 2A and 2B. For example, FIGS. 2A and 2B are meant to simply illustrate how frequencies for different components can overlap. Other impeller or shaft components could have different frequency characteristics. Also, impeller, shaft, or other components could have any other type of overlapping frequency characteristics.

Figure 3:
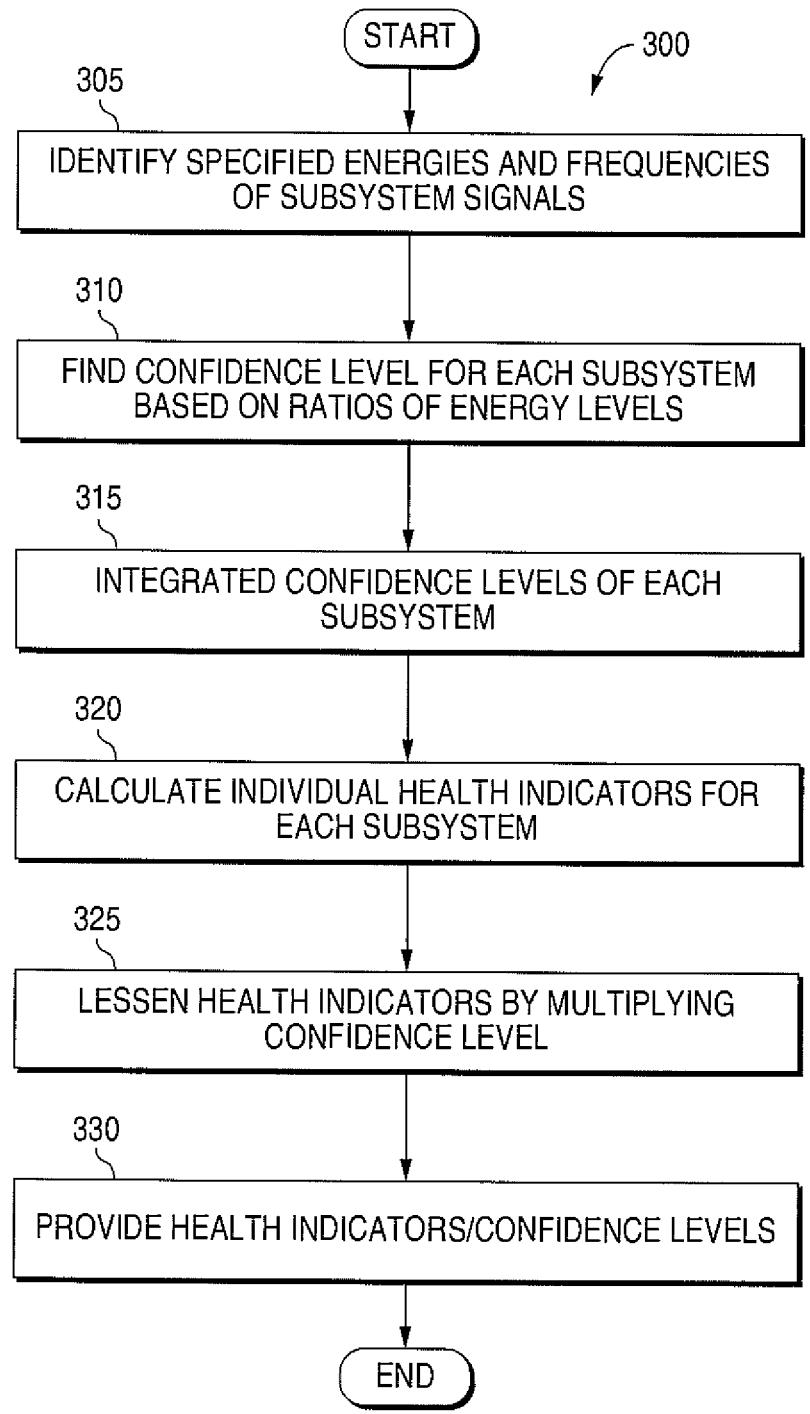
FIG. 3 illustrates an example process for conflict resolution according to this disclosure.

FIG. 3 illustrates an example process 300 for conflict resolution according to this disclosure. In particular, FIG. 3 illustrates an example process 300 for handling the first conflict type (Conflict 1) described above. The embodiment of the process 300 shown in FIG. 3 is for illustration only. Other embodiments of the process 300 could be used without departing from the scope of this disclosure. Also, for ease of explanation, the process 300 is described with respect to the SSIM 100, although the process 300 could be used with any suitable device or system.

In block 305, the SSIM identifies specified energies and frequencies in the signals from at least two subsystems. For example, the SSIM 100 could determine the energy content in overlapping frequencies for a shaft and an impeller. The SSIM 100 could determine the energy possessed by the shaft-related frequencies and determine the energy possessed by the impeller-related frequencies.

Figure 4A:
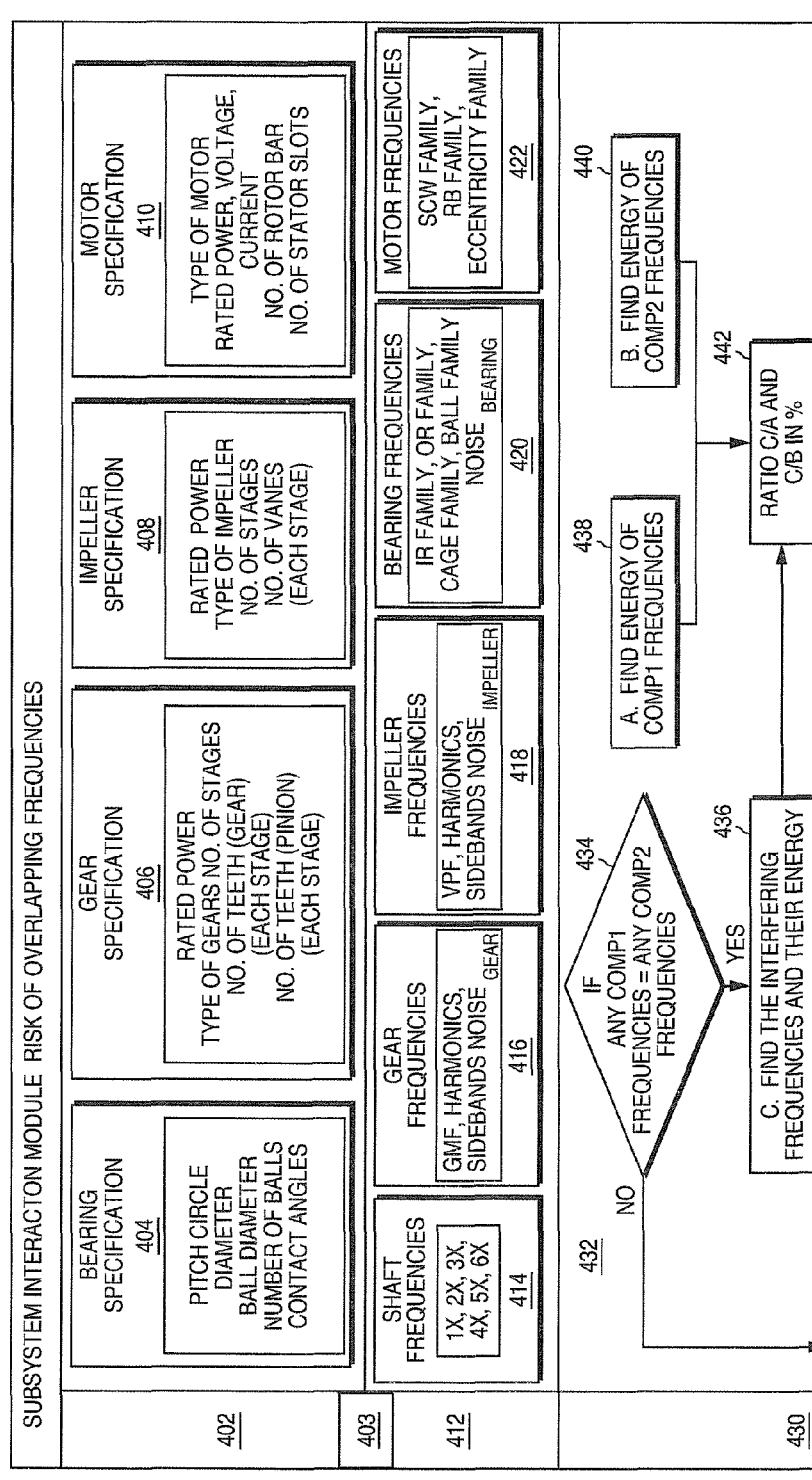
FIGS. 4A, 4B, 5A, 5B, 6A, 6B, 7A and 7B illustrate an example subsystem interaction module (SSIM) device according to this disclosure.
Figure 4B:
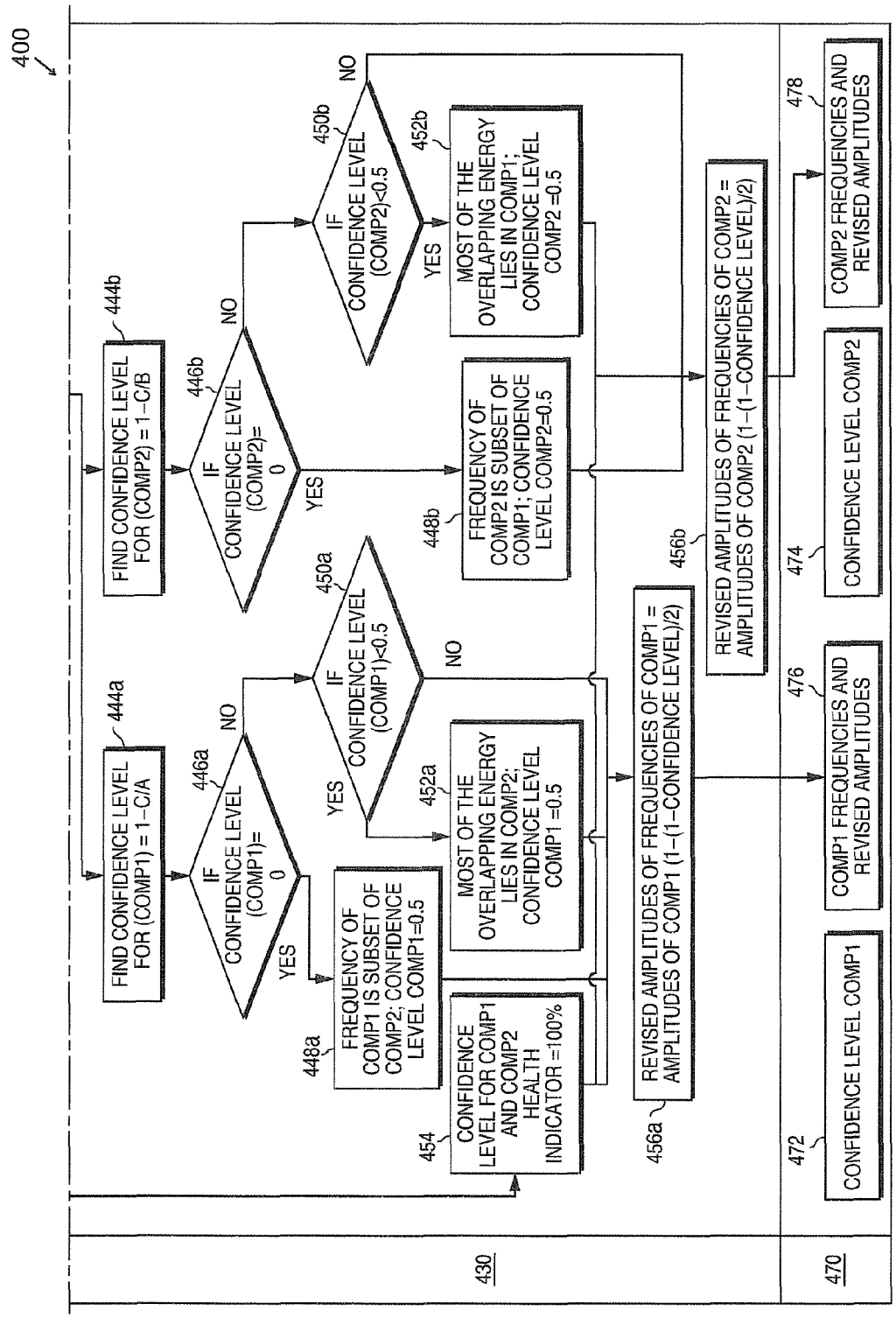

In block 310, the SSIM finds a confidence level for each subsystem based on ratios of the energy levels. For example, the SSIM 100 could determine the confidence level for each pair of subsystems, such as a shaft-impeller pair, an impeller-gear pair, a shaft-gear pair, a bearing-shaft pair, a bearing-impeller pair, a bearing-gear pair, a motor-shaft pair, a motor-impeller pair, a motor-gear pair, and a motor-bearing pair. The SSIM 100 can then calculate one or a number of confidence levels for a single subsystem. In particular embodiments, the SSIM 100 could determine the confidence levels as illustrated in FIGS. 4A and 4B.

In block 315, the SSIM integrates all of the confidence levels for each subsystem in order to generate a single resultant confidence level for each subsystem. In block 320, the SSIM calculates individual health indicators for each subsystem. The health indicators could be based on the single confidence level determined for each subsystem. In block 325, the SSIM can lessen the health indicators in some manner, such as by multiplying the health indicator by the confidence level. The SSIM can show the confidence levels and/or the health indicators for the subsystems in block 330. This could be done, for example, by displaying the information to an operator on an operation station (such as a local computer). In this way, the SSIM 100 can identify potential faults and the probability that a fault is going to occur.

Although FIG. 3 illustrates one example of a process 300 for conflict resolution, various changes may be made to FIG. 3. For example, while shown as a series of steps, various steps in FIG. 3 could overlap, occur in parallel, occur in a different order, or occur multiple times.

FIGS. 4A through 7B illustrate an example subsystem interaction module (SSIM) device 400 according to this disclosure. The embodiment of the SSIM device 400 shown in FIGS. 4A through 7B is for illustration only. Other embodiments of the SSIM device 400 could be used without departing from the scope of this disclosure.

In this example, the SSIM device 400 includes a user configuration portion 402. The user configuration portion 402 provides a user interface that facilitates operator interaction with the SSIM device 400. For example, the user configuration portion 402 may enable an operator to enter specification information. As particular examples, the user configuration portion 402 may allow the operator to enter bearing specifications 404, such as pitch circle diameter, ball diameter, the number of balls, or contact angles. The operator can also enter gear specifications 406, such as rated power, the type of gears, the number of stages, or the number of teeth per stage for a gear or a pinion. In addition, the operator can enter impeller specifications 408, such as a rated power, the type of impeller, the number of stages, or the number of vanes per stage. Further, the operator can enter motor specifications 410, such as the type of motor, a rated power, a voltage or current, the number of rotor bars, or the number of stator slots. The SSIM device 400 can store the information that is received via the user configuration portion 402 in a memory 403.

The SSIM device 400 also includes a monitor input portion 412. The monitor input portion 412 provides an interface for receiving inputs from monitors coupled to or otherwise associated with their respective subsystems (components). In this example, the monitor input portion 412 includes interfaces to receive shaft frequencies 414, gear frequencies 416, impeller frequencies 418, bearing frequencies 420, and motor frequencies 422. The gear frequencies 416 can include gear mesh frequencies (GMFs), harmonics, sidebands, and noise. The impeller frequencies 418 can include vane pass frequencies (VPFs), harmonics, sidebands, and noise. The bearing frequencies 420 can include multiple families of bearing frequencies, such as inner race (IR), outer race (OR), cage, and ball families of frequencies. The bearing frequencies 420 can also include noise. The motor frequencies 422 can similarly include multiple families of motor frequencies. Interfaces to other or additional types of monitors or sensors could also be provided in the monitor input portion 412. The SSIM device 400 can store the information received through the monitor input portion 412 in the memory 403. For example, the monitor input portion 412 can receive noise floor information with each of the component frequencies 414-422. The noise floor in the vibration characteristics can occur due to various defects such as cavitations, generalized roughness in the bearings, and gear wear.

The SSIM device 400 further includes an Artificial Intelligence (AI), an algorithm, or other processing portion 430. In this example, the processing portion 430 includes a processor core 432. The processor core 432 can include one or more processors adapted to perform various functions. These functions can include determining energy content of overlapping frequencies, energy content of shaft-related frequencies, and energy possessed by impeller-related frequencies. These functions can also include determining confidence levels for each component (subsystem), calculating individual health indicators for each component, and outputting the confidence levels and health indicators or using the same to lessen respective health indicators. As noted above, the SSIM device 400 can determine confidence levels for pairs of subsystems.

In this example, the processing portion 430 determines if the frequencies of any component match the frequencies of another component at step 434. If so, the processing portion 430 finds the interfering frequencies and their respective energies at step 436.

The processing portion 430 can also find the energy of frequencies of a first component at step 438 and the energy of frequencies of a second component at step 440. The processing portion 430 can find ratios of the energies for the first and second components to the energy of the overlapping frequencies at step 442. For both ratios, the processing portion 430 finds confidence levels at steps 444a-444b. In some embodiments, the confidence level can be determined from the following equations:

$$Comp1 = 1 - C/A$$

$$Comp2 = 1 - C/B$$

where C is the energy of the overlapping frequencies of the components, A is the energy of the frequencies for the first component (such as the shaft), and B is the energy of the frequencies for the second component (such as the impeller).

The processing portion 430 determines if each confidence level is "0" at steps 446a-446b. If a confidence level equals "0," the processing portion 430 identifies the frequency of the first component as a subset of the second component or vice versa at steps 448a-448b. In these cases, the processing portion 430 sets the confidence level of the first or second component to "0.5." If the confidence level does not equal "0," the processing portion 430 determines if each confidence level is less than "0.5" at steps 450a-450b (that is, "yes" if confidence level is <0.5 and "no" if confidence level is not <0.5). If so, the processing portion 430 identifies that most of the overlapping energies are included in the other component and sets the confidence level to "0.5" at steps 452a-452b. For example, if the processing portion 430 determines that Comp1<0.5, most of the overlapping energies are included in the second component, and the processing portion 430 sets the confidence level of the first component to "0.5" (COMP1=0.5).

If there are no overlapping frequencies at step 434, the processing portion 430 sets the confidence levels for the different components at 100% in step 454. This is done since there is no frequency overlap between the subsystems, so one subsystem's frequencies are not interfering or overlapping with another subsystem's frequencies.

The processing portion 430 revises the amplitudes of each component based on the identified confidence levels at steps 456a-456b. In some embodiments, the amplitudes of the component frequencies are based on the following equations:

$$Comp1 = \text{Amplitude of Comp1}(1-(1-\text{Confidence Level})/2)$$

$$Comp2 = \text{Amplitude of Comp2}(1-(1-\text{Confidence Level})/2).$$

The processing portion 430 can perform this process for each of the component pairs that have overlapping frequencies. It will be understood that the use of two interfering components is for example purposes only. For example, the processing portion 430 could analyze triplets of components.

In addition, the SSIM device 400 includes an output interface 470. The output interface 470 represents an interface configured to send information to another system or device, such as a computer or a display. The output interface 470 could represent or provide data to a single display (such as a monitor) or to multiple displays. In this example, the output interface 470 includes confidence level indicators 472-474 and revised amplitudes of the frequency characteristics of each component 476-478. These revised frequency characteristics can be provided as an input to systems such as those described in pending U.S. patent application Ser. No. 12/417,452 and U.S. patent application Ser. No. 12/417,475 (now U.S. Pat. No. 7,945,397), the contents of which are hereby incorporated by reference, to get revised health indicators shown in block 330. The confidence level indicators 472-474 identify the confidence levels associated with the health indicators for the two components. The frequency/amplitude indicators 476-478 provide the frequencies and revised amplitudes for the two components. In some embodiments, the output interface 470 may also include a confidence level and health indicators for the entire system (if applicable or desired). These indicators 472-478 can collectively identify the health of the system being monitored.

As noted above, the SSIM device 400 can determine confidence levels for each pair of subsystems in a machine. Therefore, the SSIM device 400 can calculate and output a number of confidence levels for a single subsystem. The SSIM device 400 can also integrate all of the confidence levels for a subsystem to generate a single resultant confidence level for that subsystem. The SSIM device 400 can further calculate individual health indicators for each subsystem and present the confidence level along with the health indicator for each subsystem (thus signifying the probability that a defect will occur) or lessen the health indicators by multiplying them by the confidence level. The SSIM device 400 could also perform both operations.

In other embodiments, the SSIM device 400 can simply ignore or neglect the overlapping frequencies in each of the component pairs. The SSIM device 400 can then determine the health indicators from the remaining (non-overlapping) frequencies and their respective amplitudes.

In yet other embodiments, the SSIM device 400 performs the confidence level calculations at a failure mode level. For example, the SSIM device 400 can use the frequencies 210-212 to determine the likelihood of a loose shaft and to determine the likelihood of an impeller crack. The processing portion 430 could also perform Fuzzy rule-based diagnostics related to failure modes. The Fuzzy rule-based diagnostics can have various combinations of membership functions and can apply various aggregation and defuzzification methods.

In particular embodiments, the SSIM device 400 outputs all of the faults related to one or more indices, rather than employing method to determine the probability of a fault. In other particular embodiments, the SSIM device 400 displays or otherwise outputs the confidence levels without lessening the energy content of any of the frequencies.

Figure 5A:
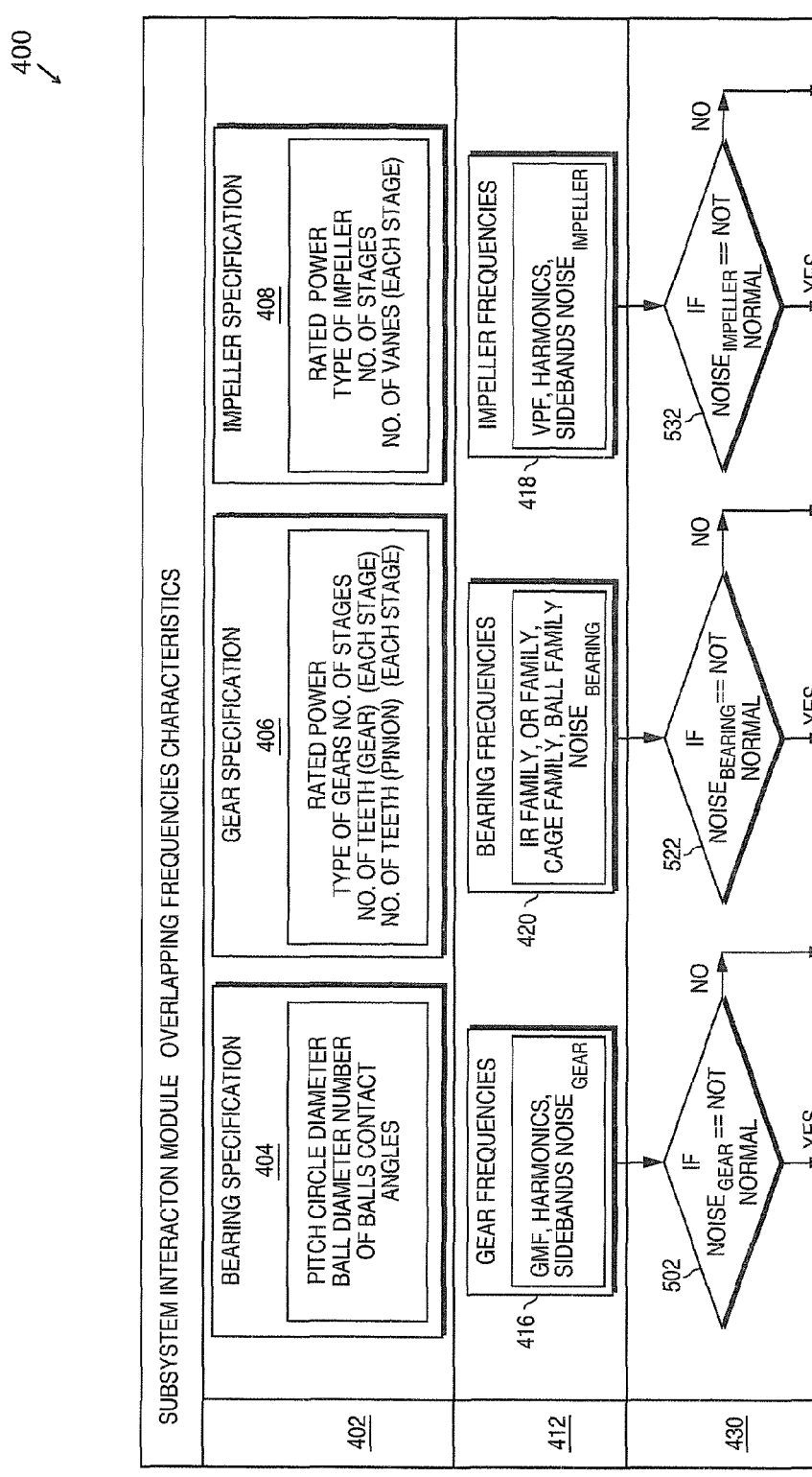
Figure 5B:
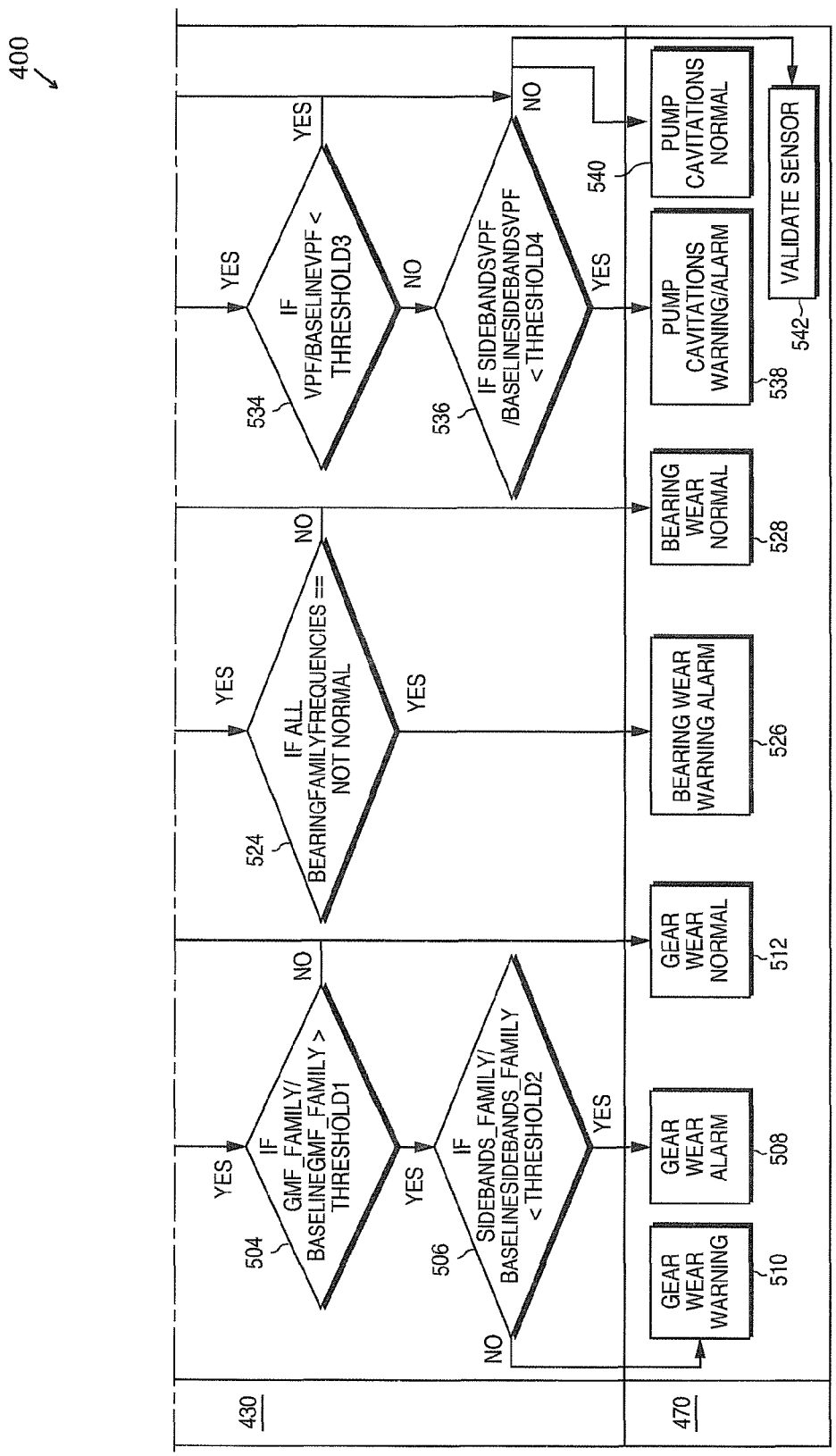

FIGS. 5A and 5B illustrate how the SSIM device 400 can perform conflict resolution for a second conflict type (Conflict 2) described above. When overlapping frequency characteristics from various failure modes exists, the processing portion 430 reads the noise floor for each of the components, such as $Noise_{gear}$ in the gear frequencies 416, $Noise_{impeller}$ in the impeller frequencies 418, and $Noise_{bearing}$ in the bearing frequencies 420. As a particular example, a bearing's generalized roughness, wear, or under-lubrication can excite individual defect frequencies and their harmonics and sidebands. The sidebands can depend on the modulating signal. In case of an inner race defect, the inner race defect frequency can be modulated by the components to which it is coupled, which are ball spin frequency and rotating shaft frequency. Similarly, if cavitations exist, an impact sign in the time domain signal may also exist. The impeller vane pass frequency and its harmonics and sidebands can have decreased amplitude in the frequency domain signal due to a vapor cloud forming inside a pump caused by the cavitations. The cavitations' bubbles may not lessen the severity of all the frequencies as the fluid may not reach the casing and there may be recirculation. Measuring performance parameters can confirm the presence of cavitations. In the case of gear wear, along with the noise floor, the gear mesh frequency and its harmonics can have large amplitude. By including these additional measurement points, the noise floor can be specifically attributed to a particular fault. Also, when a sensor fails, the sensor may produce a large noise floor with decreased amplitudes of all frequencies.

The processing portion 430 determines if each of the noise floors is above a normal level. In this example, the processing portion 430 determines if the noise floor for the gear is above a threshold value and, as such, is not normal ($Noise_{gear}$=Not normal) at step 502. If the gear noise floor is not normal, the processing portion 430 determines if the ratio GMF_family/BaselineGMF_family is above a first threshold value (threshold1) at step 504. The baseline GMF value can represent the gear mesh frequency energy during normal (baseline) operation. If the ratio is greater than the threshold value, the processing portion 430 determines if the ratio sidebands_family/BaselineSidebands_family is below a second threshold value (threshold2) at step 506. If the sidebands ratio is less than the second threshold value, the processing portion 430 triggers a gear wear alarm through the output interface 470 at step 508. Otherwise, the processing portion 430 triggers a gear wear warning through the output interface 470 at step 510. If the processing portion 430 determines that the gear noise floor is normal at step 502 or if the ratio is not greater than the threshold value at step 504 (i.e., "no" at step 504), the processing portion 430 triggers a gear wear normal indicator through the output interface 470 at step 512.

The processing portion 430 determines if the noise floor for the bearing is above a threshold value and, as such, is not normal ($Noise_{bearing}$=Not normal) at step 522. In some embodiments, processing portion 430 can analyze the bearing noise floor independent of the determination that the gear noise floor is normal. If the bearing noise floor is not normal (i.e., "yes" at step 522), the processing portion 430 determines if the families of bearing frequencies are normal at step 524. If not, the processing portion 430 triggers a bearing wear alarm through the output interface 470 at step 526. Otherwise, if the bearing noise floor is normal or if the bearing family frequencies are normal (i.e., "no" at step 522), the processing portion 430 triggers a bearing wear normal indicator through the output interface 470 at step 528.

The processing portion 430 determines if the noise floor for the impeller is above a threshold value and, as such, is not normal ($Noise_{impeller}$=Not normal) at step 532. In some embodiments, the processing portion 430 can analyze the impeller noise floor independent of the determination that the gear noise floor is normal or that the bearing noise floor is normal. If the impeller noise floor is not normal, the processing portion 430 determines 534 if the ratio VPF/Baseline_VPF family is below a third threshold value (threshold3) at step 534. The baseline VPF value could denote the energy of the vane pass frequencies during normal (baseline) operation. If the ratio is greater than the third threshold value, the processing portion 430 determines if the ratio sidebandsVPF/BaselineSidebandsVPF is below a fourth threshold value (threshold4) at step 536. If so, the processing portion 430 triggers a pump cavitations warning or alarm through the output interface 470 at step 538. If the impeller noise floor is normal, the VPF/BaselineVPF_family ratio is below the third threshold value, or the sidebandsVPF/BaselineSidebandsVPF ratio is greater than the fourth threshold value, the processing portion 430 triggers a pump cavitations normal indicator through the output interface 470 at step 540. The processing portion 430 can also provide a "validate sensor" indicator via the output interface 470 at step 542.

Figure 6A:
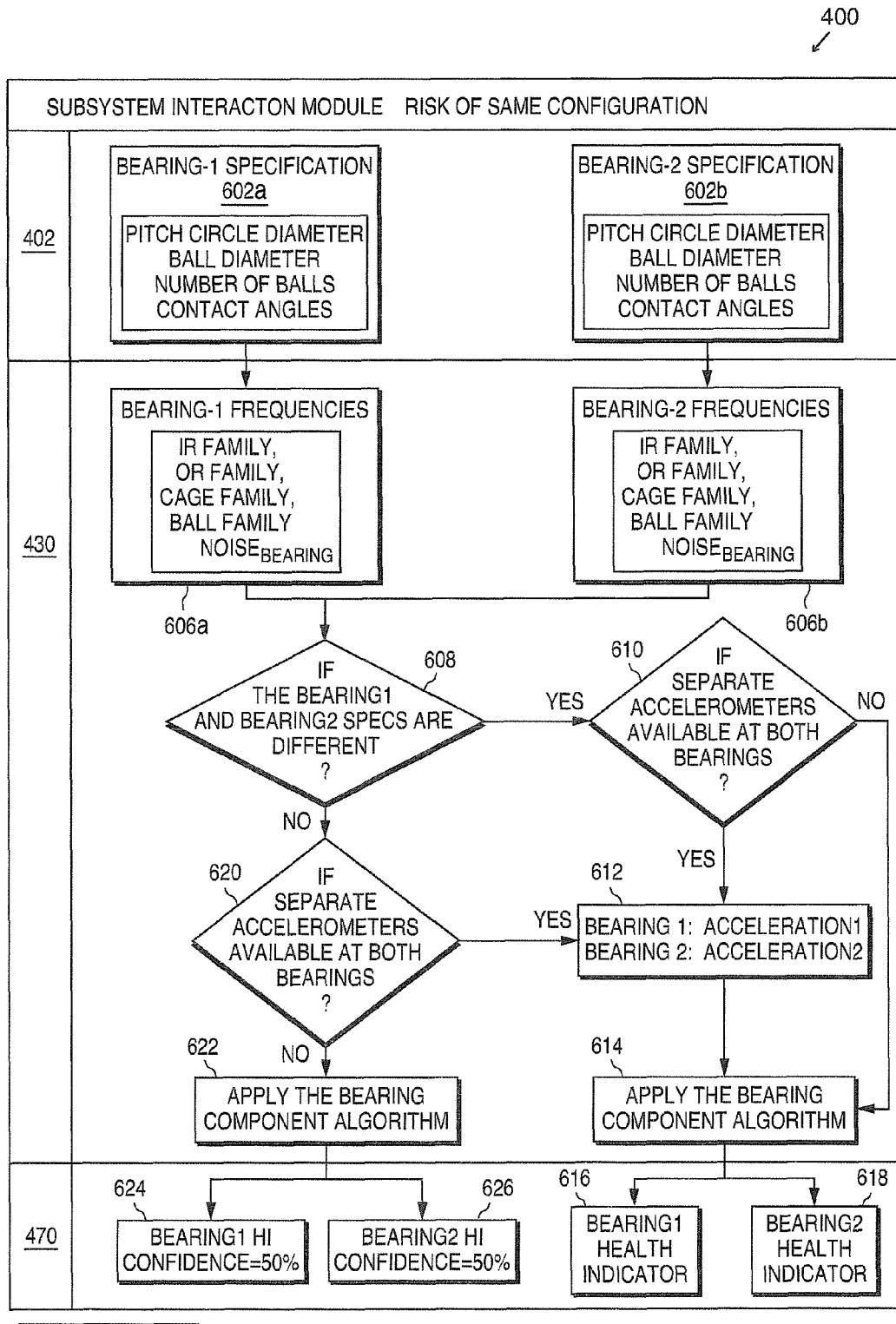
Figure 6B:
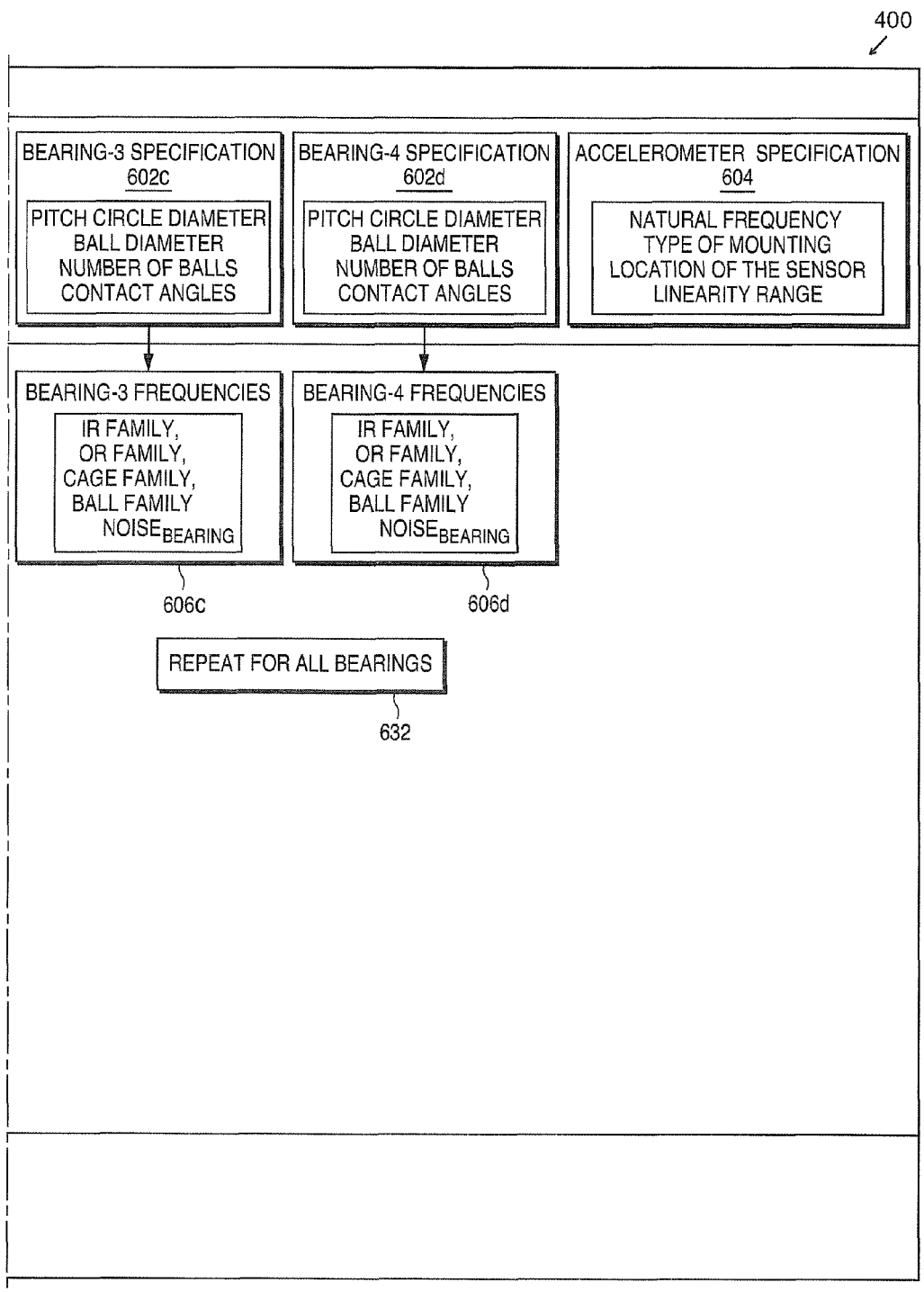

FIGS. 6A and 6B illustrate how the SSIM device 400 can perform conflict resolution for a third conflict type (Conflict 3) described above. When some subsystems have the same configuration, their frequency characteristics can be the same. If one sensor is used to monitor these components, the frequency characteristics can vary depending upon, for example, the vibration transmission path of these components from the sensor. The effect of these subsystems on the vibration signal of the sensor can therefore vary. If the amplitude increases, it is difficult to assign this increase to any individual subsystem, so the health indicators of multiple subsystems can be high. Therefore, the operator can be alerted with a 50% confidence level to each health indicator.

In some embodiments, the SSIM device 400 includes multiple sensors or a multi-sensor configured to sense different subsystems. The SSIM device 400 can use a vibration transmission path with respect to multiple subsystems using two or more sensors. For example, a first sensor can be mounted near subsystem #1, and a second sensor can be mounted near subsystem #2. In the event that subsystem #1 fails, the first sensor can be in a better position to detect the failure by detecting higher vibration amplitudes. The second sensor may sense an increase in vibration amplitude, but this may not be very large in comparison to the increase in amplitude at the first sensor.

As shown in FIGS. 6A and 6B, the user configuration portion 402 includes interfaces to receive bearing specifications 602a-602d for multiple bearings and accelerometer specifications 604. The accelerometer specifications can include parameters such as a natural frequency, the type of mounting, a location of the sensor, and a linearity range. An accelerometer can be used to sense vibration associated with the bearings.

The processing portion 430 can extract the bearing frequencies 606a-606d for the bearings from the bearing specifications 602a-602d. The processing portion 430 compares the bearing specifications for a pair of bearings at step 608 to determine if they are different. If so, the processing portion 430 determines if separate accelerometers are available for the bearings at step 610. When there are separate accelerometers, the processing portion 430 determines the acceleration associated with each bearing at step 612 and applies a bearing component algorithm for each individual bearing at step 614. Based on the result of the bearing component algorithm, the processing portion 430 provides first and second health indicators for the bearings via the output interface 470 at steps 616-618. When there are not separate accelerometers, the processing portion 430 applies a bearing component algorithm to the combined bearings at step 614.

When the bearings have the same specifications at step 608, the processing portion 430 again determines if separate accelerometers are available at step 620. If so, the processing portion 430 returns to step 612. Otherwise, the processing portion 430 applies the bearing component algorithm for the bearings at step 622 and outputs a 50% confidence level for both bearings via the output interface 470 at steps 624-626. In this case, it is not clear which bearing might cause a fault, so the fault is identified for both bearings with a 50% certainty/confidence.

This process can be repeated at step 632 for each pair of bearings that are specified. In this case, for example, the process could occur six times to cover the six unique pairs of the four bearings.

Figure 7A:
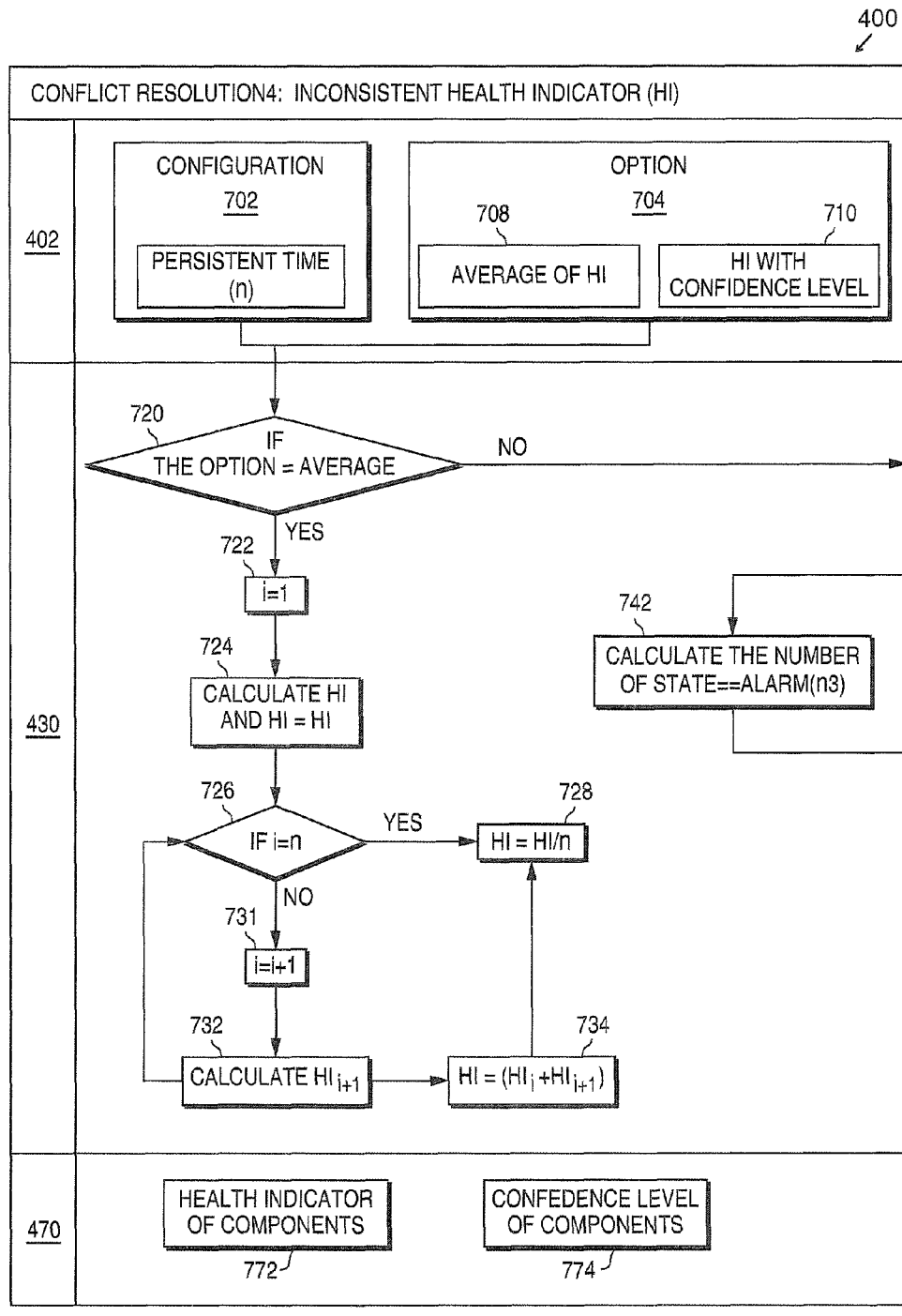
Figure 7B:
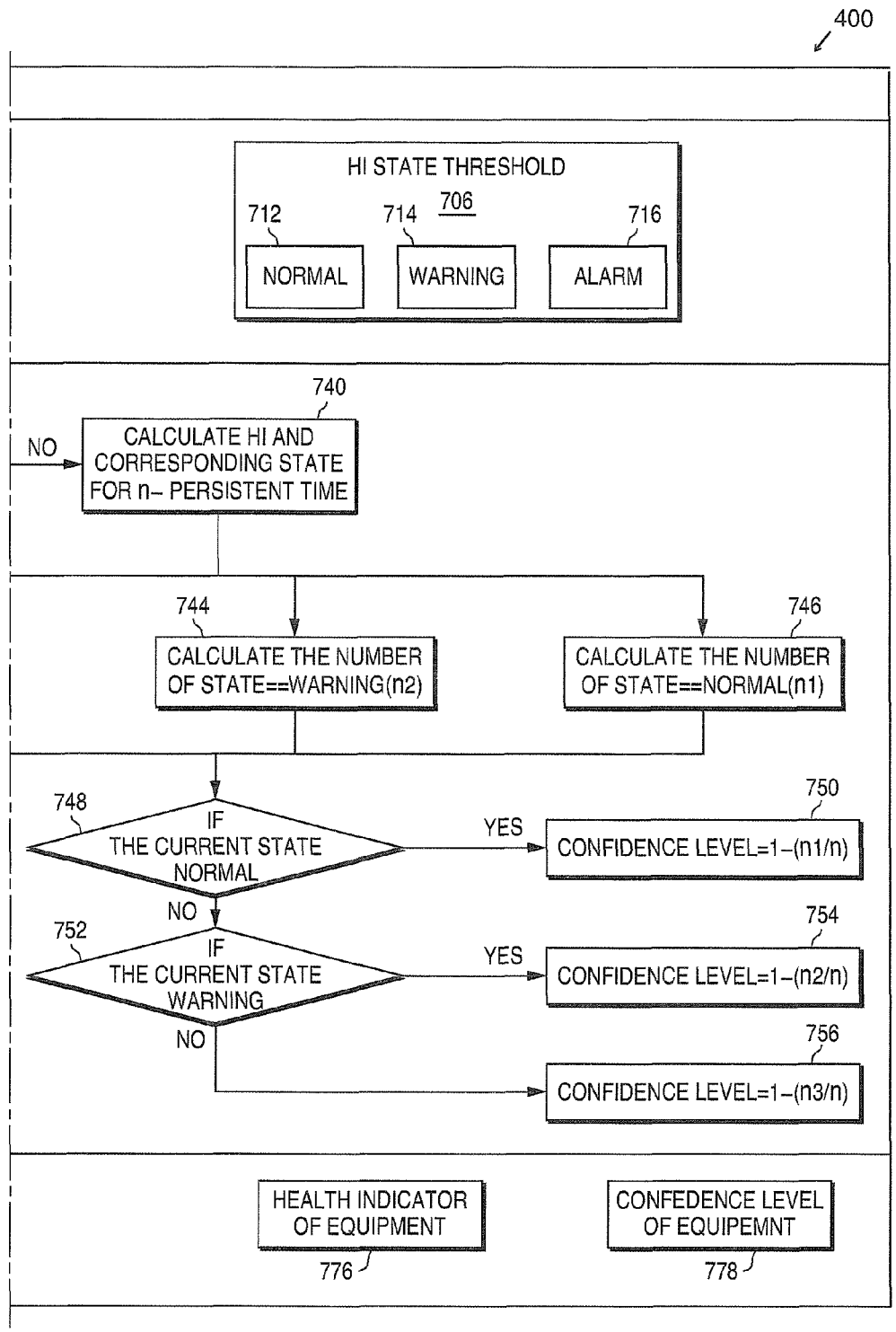

FIGS. 7A and 7B illustrate how the SSIM device 400 can perform conflict resolution for a fourth conflict type (Conflict 4) described above. When one or more subsystems suffer from data repeatability or any other issues, the health indicators at various times can be different. Data repeatability issues can arise when a foundation looseness exists, when there is sensor damage, or when a vibration path is very large. Some systems can average input data to address the data repeatability issue. However, simple averaging of the input data can result in large variations in the amplitudes, and time-synchronous averaging can cause a loss of energy of non-synchronous frequencies like that of the bearings. In some embodiments, the SSIM device 400 can average health indicators for a persistent time. The SSIM device 400 can average the input data received through the monitor input portion 412 as well as the health indicators output through the output interface 470. The SSIM device 400 also can send an alarm level that includes an averaged confidence level.

The SSIM device 400 can output various information to an operator in order to enable the operator to decide what types of information to view. This information can include average health indices or average confidence levels attached to the health indices. Moreover, the SSIM device 400 can output a very low confidence value whenever a data repeatability issue exists. In some embodiments, the SSIM device 400 activates an alarm only when both a health index and the confidence level attached to it are very high. This can help to reduce any false alarms as well as prioritize action if a fault level is consistent over time. The persistent time can be any suitable specified amount of time.

As shown in FIGS. 7A and 7B, the user configuration portion 402 includes interfaces to receive a persistent time (n) 702, output option settings 704, and health indicator (HI) state threshold settings 706. The option settings 704 can include selections for an average of health indicators 708 and a health indicator with a confidence level 710. The threshold settings 706 can include settings for normal operations 712, warnings 714, and alarms 716.

The processing portion 430 can extract the persistent time 702 and the option settings 704 for a comparison operation at step 720. When an operator has selected an average of health indicators 708, the processing portion 430 initializes a counter (i=1) at step 722 and calculates a health indicator (HI=$HI_i$) at step 724. The processing portion 430 compares the counter to a persistent time value (n) at step 726. If the counter equals the persistent time value, the processing portion 430 calculates the average health indicator (HI=HI/n) at step 728. If the counter does not equal the persistent time value, the processing portion 430 increments the counter at step 731 and calculates another health indicator ($HI_{i+1}$) at step 732. The processing portion 430 adds the most recent health indicators (HI=$HI_i$+$Hi_{i+1}$) at step 734 and sets the average health indicator (HI=HI/n) at step 728.

When the operator has selected the health indicator with confidence level 710 (not the average at step 720), the processing portion 430 calculates a health indicator and the corresponding states for n-persistent time at step 740. The processing portion 430 calculates the number of states that are alarms at step 742, the number of states that are warnings at step 744, and the number of states that are normal at step 746. The processing portion 430 determines if the current state is normal at step 748. If the current state is normal, the processing portion 430 sets the confidence level to a first specified value (1−n1/n) at step 750. If the current state is not normal, the processing portion 430 determines if the current state is a warning at step 752. If the current state is a warning, the processing portion 430 sets the confidence level to a second specified value (1−n2/n) at step 754. If the current state is not a warning, the processing portion 430 sets the confidence level to a third specified value (1−n3/n) at step 756.

The processing portion 430 outputs the health indicators and confidence levels through the output interface 470. The output interface 470 can display health indicators 772 and confidence levels 774 for components and health indicators 776 and confidence levels 778 for equipment.

Although FIGS. 4A through 7B illustrate one example of an SSIM device 400, any number of modifications could be made to these figures. For example, any suitable types of faults could be detected. Additionally, for conflict resolution for a fourth conflict type (Conflict 4) illustrated in FIGS. 7A and 7B, persistent time can be implemented for input data of Health Indication System rather than output data, that is, Health Indicators. Also, various functions shown as being performed by the SSIM device 400 could be combined, further subdivided, or omitted and additional functions could be added according to particular needs. In addition, the processing portions 430 can include one or multiple processing devices wherein different processing devices are configured to resolve different conflict types.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   at least one interface configured to receive input signals associated with multiple components of a system from one or more sensors that are configured to monitor the system; and
   at least one processing unit configured to identify a potential fault in one or more of the components using the input signals and to provide an indicator identifying the potential fault;
   wherein the at least one processing unit is configured to identify the potential fault by:
      identifying conflicting frequencies that are associated with different faults in the components of the system; and
      determining a confidence level associated with the potential fault based on the conflicting frequencies.

2. The apparatus of claim 1, wherein the conflicting frequencies comprise overlapping frequencies associated with the different faults.

3. The apparatus of claim 1, wherein the at least one processing unit is configured to identify the conflicting frequencies by determining that at least two of the components have a matching configuration.

4. The apparatus of claim 1, wherein the at least one processing unit is configured to identify the potential fault by at least one of:
   comparing a noise floor associated with the input signals to a noise floor corresponding to a normal operation; and
   comparing at least one ratio associated with one or more families of frequencies to at least one threshold.

5. The apparatus of claim 1, wherein the at least one processing unit is configured to:
   determine if more than one sensor is used to monitor two of the components;
   calculate a single indicator and set a confidence level to 50% when the two components are monitored by a single sensor; and
   calculate multiple indicators and set a separate confidence level for each of the indicators when the two components are monitored by different sensors.

6. The apparatus of claim 1, wherein the at least one processing unit is configured to average multiple indicators associated with the potential fault over a specified persistent time.

7. The apparatus of claim 1, wherein the at least one processing unit is configured to determine the confidence level based on one or more ratios of energy levels associated with different frequency components of the input signals.

8. The apparatus of claim 7, wherein the at least one processing unit is further configured to lessen the indicator for the potential fault based on the determined confidence level.

9. A method comprising:
   receiving, from one or more sensors, input signals associated with multiple components of a system;
   identifying, by at least one processing unit, one or more frequencies for each of multiple faults that could occur in the components;
   identifying, by the at least one processing unit, conflicting frequencies that are associated with different faults in the components;
   identifying, by the at least one processing unit, a potential fault in one or more of the components using the input signals;
   determining, by the at least one processing unit, a confidence level associated with the potential fault based on the conflicting frequencies; and
   outputting, by the at least one processing unit, an indicator identifying the potential fault.

10. The method of claim 9, wherein the conflicting frequencies comprise overlapping frequencies associated with the different faults.

11. The method of claim 9, wherein identifying the conflicting frequencies comprises determining that at least two of the components have a matching configuration.

12. The method of claim 9, wherein determining the confidence level comprises determining the confidence level based on one or more ratios of energy levels associated with different frequency components of the input signals.

13. The method of claim 9, wherein identifying the potential fault comprises at least one of:
   comparing a noise floor associated with the input signals to a noise floor corresponding to a normal operation; and
   comparing at least one ratio associated with one or more families of frequencies to at least one threshold.

14. The method of claim 9, further comprising:
   determining if more than one sensor is used to monitor two of the components;
   calculating a single indicator and setting a confidence level to a specified confidence level when the two components are monitored by a single sensor; and calculating multiple indicators and setting a separate confidence level for each of the indicators when the two components are monitored by different sensors.

15. A non-transitory computer readable medium:
storing a plurality of instructions configured to cause a processing system to perform the steps of:
receiving input signals associated with multiple components of a system;
identifying one or more frequencies for each of multiple faults that could occur in the components;
identifying conflicting frequencies that are associated with different faults in the components;
identifying a potential fault in one or more of the components using the input signals;
determining a confidence level associated with the potential fault based on the conflicting frequencies; and
outputting an indicator identifying the potential fault.

16. The non-transitory computer readable medium of claim 15, wherein the conflicting frequencies comprise overlapping frequencies associated with the different faults.

17. The non-transitory computer readable medium of claim 15, wherein the instructions for identifying the conflicting frequencies comprise instructions configured to cause the processing system to determine that at least two of the components have a matching configuration.

18. The non-transitory computer readable medium of claim 15, wherein the instructions for determining the confidence level comprise instructions configured to cause the processing system to determine the confidence level based on one or more ratios of energy levels associated with different frequency components of the input signals.

19. The non-transitory computer readable medium of claim 15, wherein the instructions for identifying the potential fault comprise instructions configured to cause the processing system to at least one of:
compare a noise floor associated with the input signals to a noise floor corresponding to a normal operation; and
compare at least one ratio associated with one or more families of frequencies to at least one threshold.

20. The non-transitory computer readable medium of claim 15, further comprising instructions configured to cause the processing system to perform the steps of:
determining if more than one sensor is used to monitor two of the components;
calculating a single indicator and setting a confidence level to 50% when the two components are monitored by a single sensor; and
calculating multiple indicators and setting a separate confidence level for each of the indicators when the two components are monitored by different sensors.

* * * * *